United States Patent
Liao

(10) Patent No.: US 8,842,538 B2
(45) Date of Patent: Sep. 23, 2014

(54) METHOD OF HANDLING APN BASED CONGESTION CONTROL AND RELATED COMMUNICATION DEVICE

(75) Inventor: Ching-Yu Liao, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 314 days.

(21) Appl. No.: 13/253,085

(22) Filed: Oct. 5, 2011

(65) Prior Publication Data

US 2012/0082029 A1  Apr. 5, 2012

Related U.S. Application Data

(60) Provisional application No. 61/390,166, filed on Oct. 5, 2010.

(51) Int. Cl.
  *H04W 28/02* (2009.01)
  *H04W 76/02* (2009.01)
  *H04W 76/06* (2009.01)

(52) U.S. Cl.
  CPC .......... *H04W 76/025* (2013.01); *H04W 76/064* (2013.01)
  USPC ........................................................ 370/235

(58) Field of Classification Search
  USPC ................................. 370/230, 229
  See application file for complete search history.

(56) References Cited

U.S. PATENT DOCUMENTS

| | | | |
|---|---|---|---|
| 7,715,868 B2 | 5/2010 | Zhao | |
| 8,027,688 B2 * | 9/2011 | Wu | ................ 455/450 |
| 8,041,335 B2 * | 10/2011 | Khetawat et al. | ........... 455/404.2 |
| 8,570,941 B2 * | 10/2013 | Tsirtsis et al. | ................ 370/328 |
| 2005/0107091 A1 | 5/2005 | Vannithamby | |
| 2008/0132269 A1 * | 6/2008 | Shen et al. | ................... 455/550.1 |
| 2009/0239526 A1 * | 9/2009 | Zhao et al. | .................... 455/424 |

FOREIGN PATENT DOCUMENTS

| | | |
|---|---|---|
| CN | 1720754 A | 1/2006 |
| GB | 2422749 A | 8/2006 |
| JP | 200680884 A | 3/2006 |
| JP | 200743310 A | 2/2007 |
| JP | 200885794 A | 4/2008 |
| KR | 1020050072475 A | 7/2005 |
| WO | 2004043092 A1 | 5/2004 |
| WO | 2006079802 A1 | 8/2006 |
| WO | 2009083429 A1 | 7/2009 |
| WO | 2009129248 A1 | 10/2009 |
| WO | 2009135290 A1 | 11/2009 |

OTHER PUBLICATIONS

Office Action mailed on Nov. 29, 2013 for the Korean Application No. 10-2013-0017039, filing date Feb. 18, 2013, pp. 1-3.

(Continued)

*Primary Examiner* — Mohammad Anwar
(74) *Attorney, Agent, or Firm* — Winston Hsu; Scott Margo

(57) ABSTRACT

A method of initiating a service with an access point name (APN) of a wireless communication system for a mobile device in the wireless communication system is disclosed. The mobile device has a plurality of connections with the APN. The method comprises disconnecting at least one first connection of the plurality of connections from the APN, wherein the mobile device keeps at least one second connection of the plurality of connections connected; and initiating the service with the APN, after disconnecting the at least one first connection from the APN; wherein the APN is congested or overloaded.

24 Claims, 10 Drawing Sheets

(56) References Cited

OTHER PUBLICATIONS

European patent application No. 11008079.3, European Search Report mailing date:Apr. 19, 2012.
3GPP TSG SA WG2 Meeting #80 S2-104406 Aug. 30-Sep. 3, 2010, Brunstad, Norway, "NAS level reject per APN with back-off timer function", Aug. 2010.
3GPP TS 23.401 V10.1.0 (Sep. 2010) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 10).
3GPP TS 24.301 V10.0.0 (Sep. 2010) Technical Specification 3rd Generation Partnership Project; Technical Specification Group Core Network and Terminals; Non-Access-Stratum (NAS) protocol for Evolved Packet System (EPS); Stage 3 (Release 10).
Office Action mailed on Jun. 28, 2013 for the Korean Application No. 10-2011-0101483, filing date: Oct. 5, 2011, pp. 1-5.
Huawei, "PDN GW ID Deletion in Detach in MAPCON Scenarlo", 3GPP TSG SA WG2 Meeting #80, TD S2-103496, Aug. 30-Sep. 3, 2010, p. 1-2, Brunstadt, Norway.
China Mobile, "Rejecting connection requests at partial signaling links for the congestion control", 3GPP TSG SA WG2 Meeting #79E (Electronic), TD S2-103115, Jul. 6-13, 2010, p. 1-4, Elbonia.
Office Action mailed on Jan. 29, 2013 for the Japanese application No. 2011-221421, filed Oct. 5, 2011, pp. 1-3.
European patent application No. 11008079.3, European Search Report mailing date: Jan. 12, 2012.
Office Action mailed on Dec. 30, 2013 for the China application No. 201110302249.4, filing date Oct. 8, 2011.
Office Action mailed on Jun. 10, 2014 for the Japanese Application No. 2013-154954, filing date: Jul. 25, 2013, pp. 1-3.
Panasonic, "Treatment of existing EPS bearer(s) for APN based congestion control", 3GPP TSG SA WG2 Meeting #82, S2-105498, Nov. 15-19, 2010, Jacksonville, Florida, USA.
Office Action mailed on Jul. 1, 2014 for the Japanese Application No. 2013-154955, filing date: Jul. 25, 2013, pp. 1-2.

\* cited by examiner

METHOD OF HANDLING APN BASED CONGESTION CONTROL AND RELATED COMMUNICATION DEVICE

CROSS REFERENCE TO RELATED APPLICATIONS

This application claims the benefit of U.S. Provisional Application No. 61/390,166, filed on Oct. 5, 2010 and entitled "Method of APN based congestion control by using NAS level request with back-off timer or NAS level rejection with back-off timer", the contents of which are incorporated herein in their entirety.

BACKGROUND OF THE INVENTION

1. Field of the Invention

The present invention relates to a method used in a wireless communication system and related communication device, and more particularly, to a method of handling access point name (APN) based congestion control and related communication device.

2. Description of the Prior Art

A long-term evolution (LTE) system supporting the 3GPP Rel-8 standard and/or the 3GPP Rel-9 standard is developed by the 3rd Generation Partnership Project (3GPP) as a successor of a universal mobile telecommunications system (UMTS), for further enhancing performance of the UMTS to satisfy users' increasing needs. The LTE system includes a new radio interface and radio network architecture that provides a high data rate, low latency, packet optimization, and improved system capacity and coverage. In the LTE system, a radio access network known as an evolved UTRAN (E-UTRAN) includes multiple evolved NBs (eNBs) for communicating with multiple user equipments (UEs), and communicates with a core network including a mobility management entity (MME), serving gateway, etc for Non Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

An access point name (APN) is used in the LTE system and the LTE-A system for establishing packet data connections, and is managed by the MME. Further, the APN is used for identifying a packet data network (PDN) or a service type (e.g. multimedia messaging service (MMS)), wherein the PDN or the service type is carried on the packet data connections.

In prior arts, if an APN is in congestion, i.e., overloaded, the MME rejects an attach request, a tracking area update, a routing area update or a service request with the APN transmitted by a UE, and the MME replies the UE with a Mobility Management back-off timer. On the other hand, when the MME rejects a PDN connectivity request, a PDN disconnectivity request, an evolved packet system (EPS) activation request or an EPS deactivation request with the APN transmitted by the UE, the MME replies the UE with a Session Management back-off timer. In either case, the UE is not allowed to transmit the same request to the MME, before the corresponding back-timer expires. In other words, the UE cannot transmit the same request for the congested APN to the MME again as long as the corresponding back-off timer is running. However, the UE is allowed to initiate a Mobility Management procedure or a Session Management procedure with the APN for a high priority service or an emergency service, even when the Mobility Management back-off timer or the Session Management back-off timer is running. In this situation, since the APN is still in the congestion and has no resource for providing the high priority service or the emergency service, the MME rejects the high priority service or the emergency service, and a delay to access the high priority service or the emergency service is caused. Therefore, disaster may happen due to the delay of the high priority service or the emergency service.

Besides, when a back-off timer expires, the UE can transmit a request to the MME again. However, it is possible that the APN is still in the congestion and has no resource for accepting the request, and the MME needs to reject the request again. If the APN is in the congestion for a long time, the UE may transmit the request to the MME for a large number of times, and correspondingly, the MME rejects the request for the large number of times until the congestion is resolved, i.e., resource for the request is available. The large number of retransmissions and rejections worsen the congestion of the APN and increases load of the MME. In this situation, not only the delay of request is increased, delays of other requests transmitted by other UEs are also increased.

Therefore, how to handle the high priority service and the emergency service immediately is a question to be discussed and addressed. Further, it is important to mitigate the congestion of the APN such that the MME can accept the request as soon as possible. Therefore, a mechanism for mitigating the congestion of the APN is needed.

SUMMARY OF THE INVENTION

The present invention therefore provides a method and related communication device for handling access point name (APN) based congestion control to solve the abovementioned problems.

A method of initiating a service with an access point name (APN) of a wireless communication system for a mobile device in the wireless communication system is disclosed. The mobile device has a plurality of connections with the APN. The method comprises disconnecting at least one first connection of the plurality of connections from the APN, wherein the mobile device keeps at least one second connection of the plurality of connections connected; and initiating the service with the APN, after disconnecting the at least one first connection from the APN; wherein the APN is congested or overloaded.

A method of handling a service for a network of a wireless communication system is disclosed. The method comprises receiving a request for the service from a mobile device in the wireless communication system for the mobile device to access the service via an access point name (APN) of the wireless communication system, wherein the mobile device has a plurality of connections with the APN; and disconnecting at least one first connection of the plurality of connections of the mobile device, wherein the network keeps at least one second connection of the plurality of connections connected; wherein the APN is congested or overloaded.

A method of handling a plurality of mobile devices in a wireless communication system for a network of the wireless communication system is disclosed. Each of the plurality of mobile devices has at least one connection to an access point name (APN) of the wireless communication system. The method comprises selecting at least one mobile device from the plurality of mobile devices, wherein each of the at least one mobile device does not have a connection with a high priority to the APN; and transmitting a request message with a back-off timer to the at least one mobile device, for detaching the at least one mobile device from the APN; wherein the APN is congested or overloaded.

A method of handling at least one bearer of at least one connection of a mobile device in a wireless communication system for a network of the wireless communication system is disclosed. The mobile device has the at least one connection with an access point name (APN) of the wireless communication system. The method comprises selecting the at least one bearer from the at least one connection; and transmitting a deactivate request message with a back-off timer to the mobile device, for deactivating the at least one bearer of the mobile device; wherein the APN is congested or overloaded.

A method of handling at least one bearer of at least one connection of a mobile device in a wireless communication system for a network of the wireless communication system is disclosed. The mobile device has the at least one connection with an access point name (APN) of the wireless communication system. The method comprises determining the at least one bearer of the at least one connection for a modification of at least one quality of service (QoS) parameter; and transmitting a request message to the mobile device, for indicating the modification of the at least one QoS parameter of the at least one bearer of the at least one connection to the mobile device; wherein the APN is congested or overloaded.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
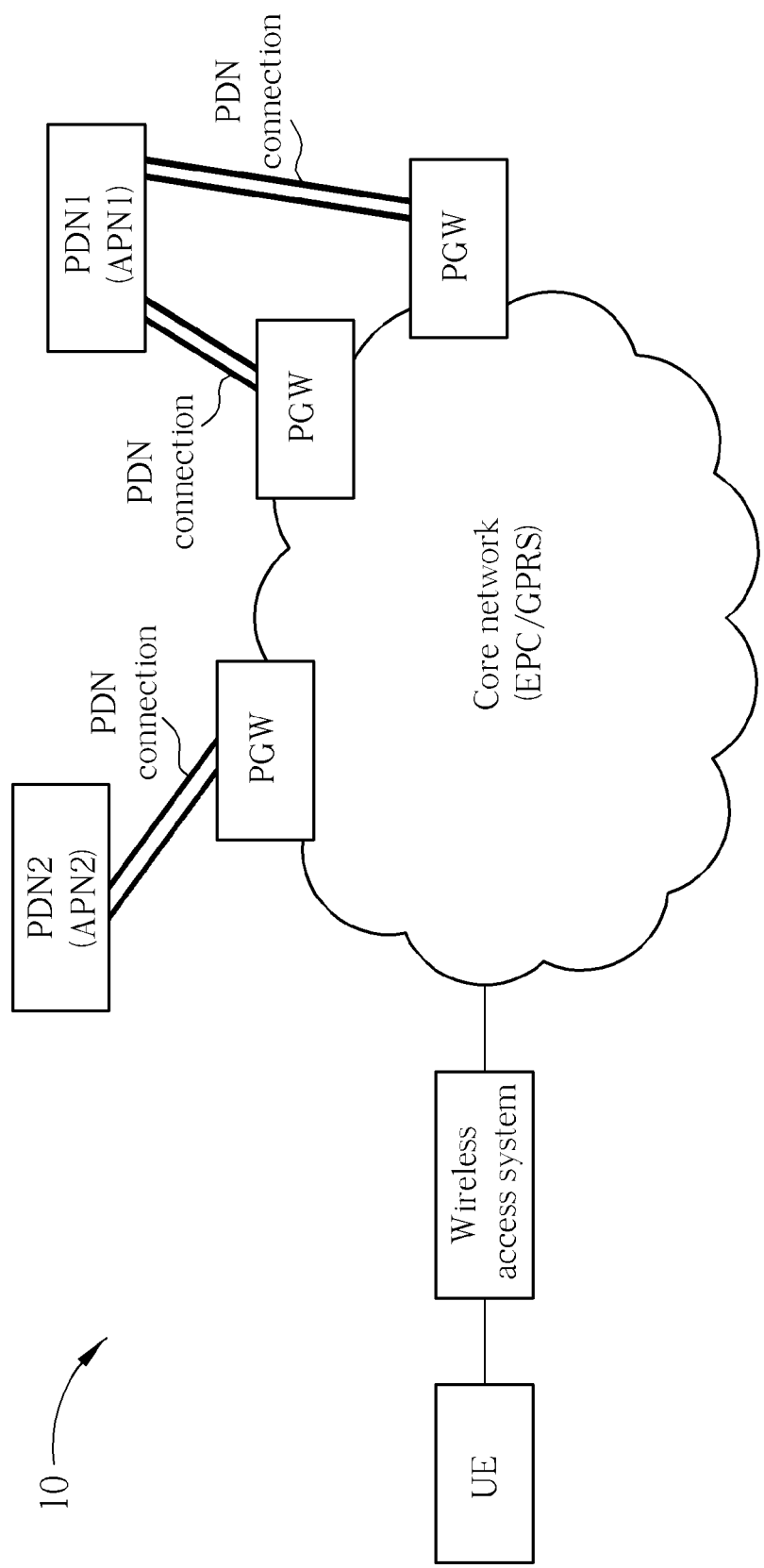
FIG. 1 is a schematic diagram of an exemplary wireless communication system according to the present invention.

Please refer to FIG. 1, which is a schematic diagram of a wireless communication system 10 according to an example of the present invention. The wireless communication system 10 comprises a wireless access system, such as a long term evolution (LTE) system or a LTE-Advanced (LTE-A) system, a core network, a user equipment (UE) and two packet data networks (PDNs) PDN1 and PDN2. A PDN provides services, e.g. Internet, IMS, etc., to the UE via the wireless access system. The core network may be an evolved packet core (EPC) network or a general packet radio service (GPRS) network, managing the PDN connectivity of the UE according to a Non Access Stratum (NAS) protocol. The PDN that the UE wants to access is based on the information of 'Access Point Name' (APN) (e.g. APN1 and APN2 shown in FIG. 1) which is a reference to the PDN for indicating where the desired services are available. The core network uses the APN when selecting the PDN to set up a PDN connection. In detail, a UE may transmit an extended session management (ESM) request via NAS signaling to the core network for establishing a PDN connection with the APN for a service, e.g. PDN connectivity/disconnectivity request, evolved packet system (EPS) bearer context activation/deactivation, etc. The core network determines whether to accept or reject the request according a criterion, such as load of the APN. The UE is allowed to access the service only if the core network accepts the request. Otherwise, the UE receives a response with a back-off timer for indicating a rejection of the request. The UE can only retransmit the request to make a PDN connection to the associated APN for the service after the back-off timer expires, i.e., stop running.

In FIG. 1, the wireless access system, the core network, the APN referred to the PDN, and the UE are simply utilized for illustrating the structure of the wireless communication system 10. Practically, the wireless access system may comprise other access technologies, such as a wireless local area network (WLAN) access point (AP), base station of Worldwide Interoperability for Microwave Access (WiMAX), universal terrestrial radio access network (UTRAN) comprising a plurality of NodeBs (NBs), evolved-UTRAN (E-UTRAN) comprising a plurality of evolved NBs (eNBs), etc. That is, a UE can have multiple PDN connections via different wireless access interfaces and connect to the same PDN associated to the same APN. Besides, the core network preferably includes a Mobile Switch Center (MSC), Mobility Management Entity (MME), Serving GPRS Support Network (SGSN), Serving Gateway (SGW), PDN Gateway (PGW) and Gateway GPRS Support node (GGSN), such that the request and the response for management of PDN connectivity and EPS bearers within the PDN connection can be exchanged between the MME/SGSN in the core network and the UE. The UE can be a mobile device such as a mobile phone, laptop, tablet computer, electronic book, machine type communication (MTC) device and portable computer system.

Figure 2:
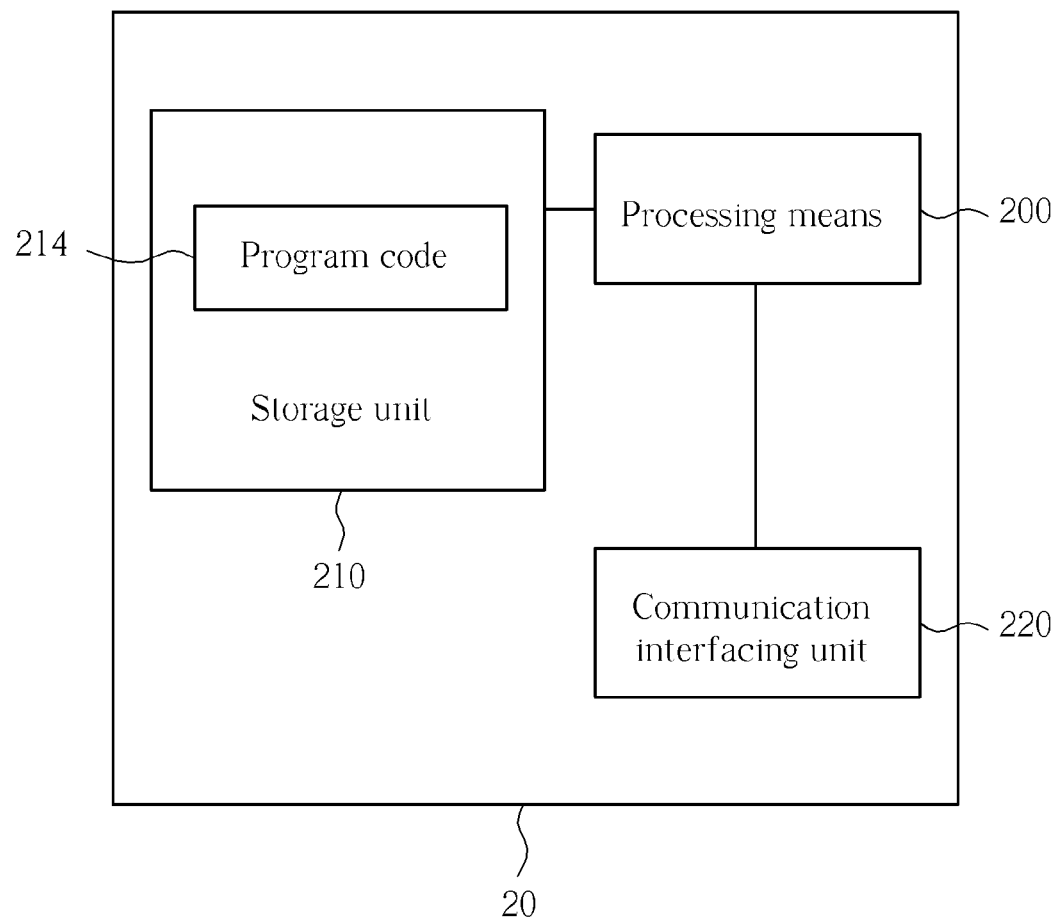
FIG. 2 is a schematic diagram of an exemplary communication device according to the present invention.

Please refer to FIG. 2, which is a schematic diagram of a communication device 20 according to an example of the present invention. The communication device 20 can be the UE or the core network shown in FIG. 1, but is not limited herein. The communication device 20 may include a processor 200 such as a microprocessor or an Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a transceiver and can exchange signals/messages in control plane and user plane with the core network according to processing results of the processor 200.

Figure 3:
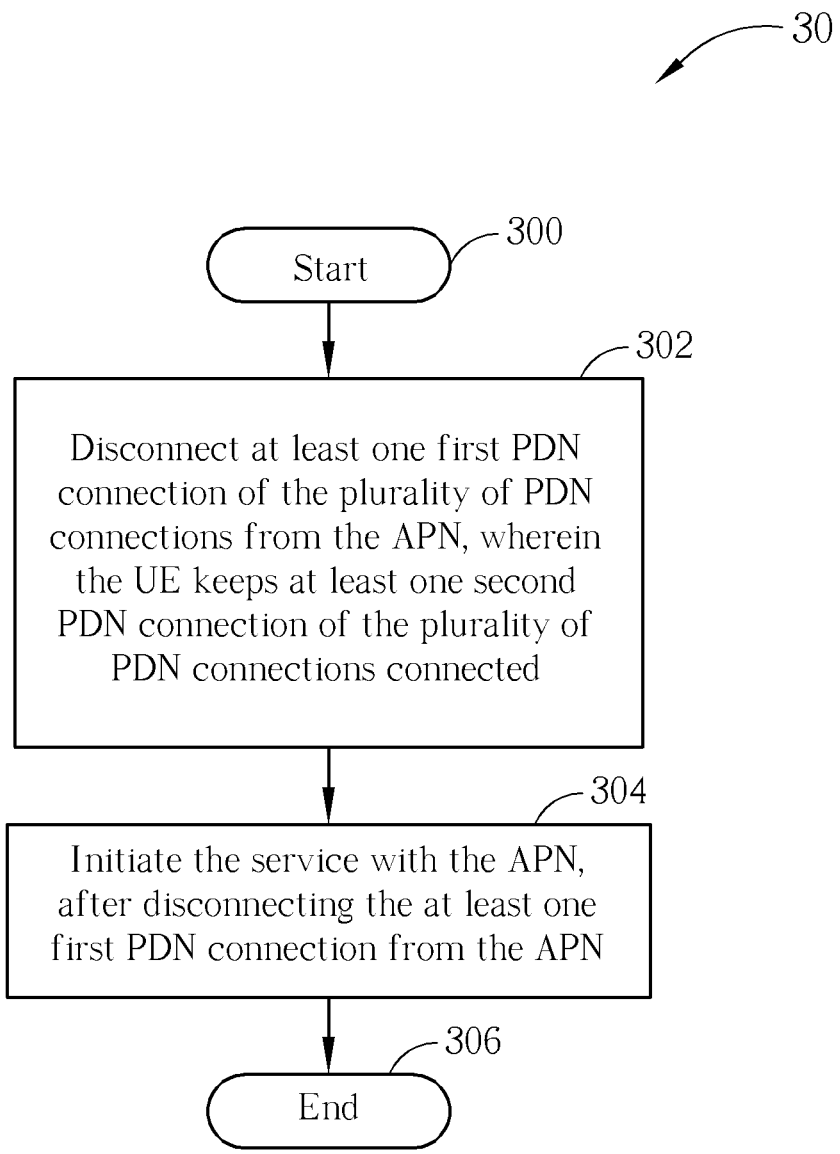
FIG. 3 is a flowchart of an exemplary process according to the present invention.

Please refer to FIG. 3, which is a flowchart of a process 30 according to an example of the present invention. The process 30 is utilized in a UE shown in FIG. 1. The UE has a plurality of PDN connections associated with the same APN, and prepares to initiate a service with the APN. The process 30 may be compiled into the program code 214 and includes the following steps:

Step 300: Start.

Step 302: Disconnect at least one first PDN connection of the plurality of PDN connections from the APN, wherein the UE keeps at least one second PDN connection of the plurality of PDN connections connected.

Step 304: Initiate the service with the APN, after disconnecting the at least one first PDN connection from the APN.

Step 306: End.

According to the process 30, before the UE initiates the service with the APN, the UE first disconnects the at least one first PDN connection of the plurality of connections from the APN, for releasing resource of the at least one first PDN connection, to increase the acceptance rate of the service. Besides, the UE keeps the at least one second PDN connection of the plurality of PDN connections connected. That is, the UE does not release all the PDN connections with the APN to maintain an attach status with the APN. Therefore, when the APN is in congestion, the APN is still possible to provide the service to the UE by using the resource of the at least one first PDN connection which is just released by the UE. The UE can access the service without a delay.

Figure 4:
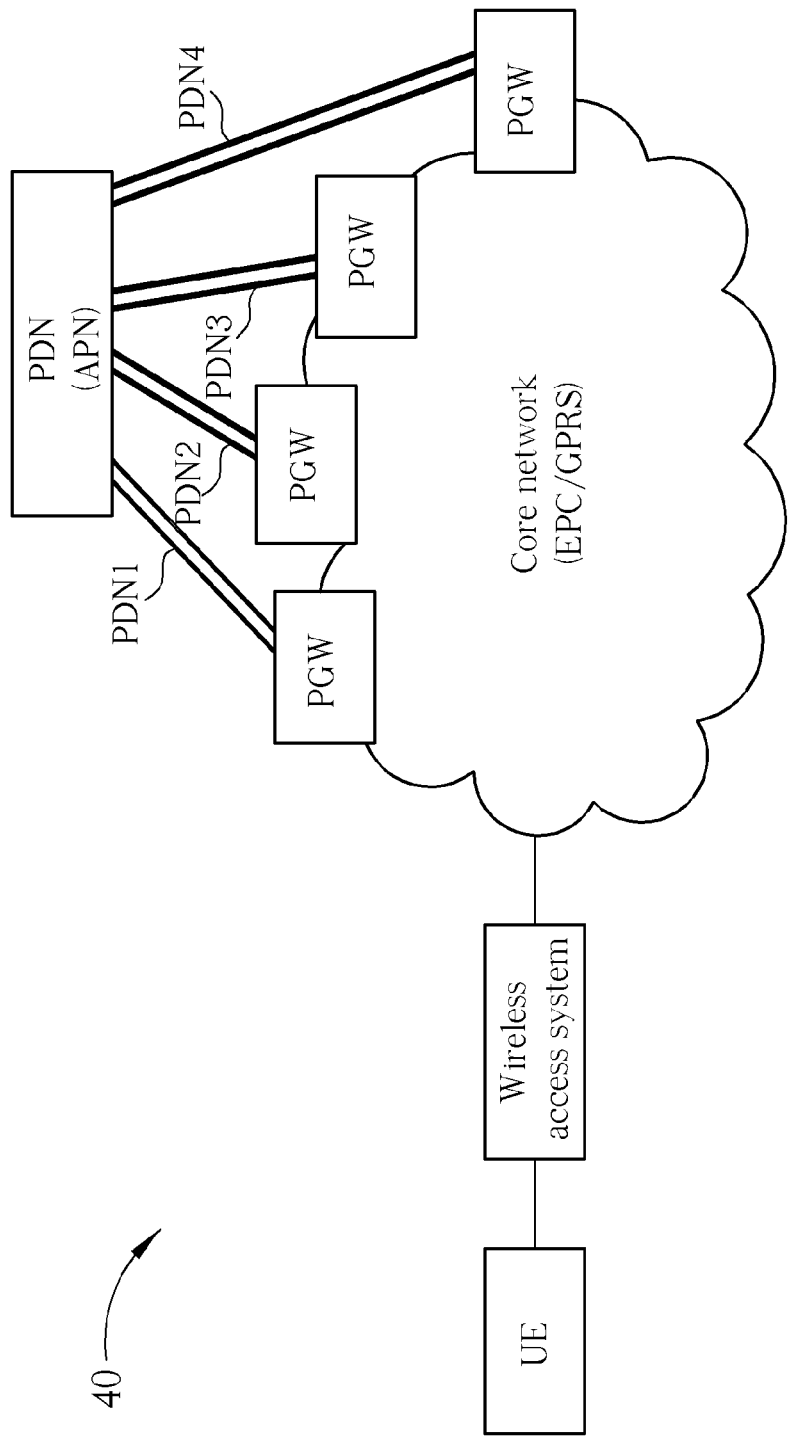
FIG. 4 is a schematic diagram of an exemplary wireless communication system according to the present invention.

For example, please refer to FIG. 4, which is a schematic diagram of a wireless communication system 40 according to an example of the present invention. FIG. 4 is modified from FIG. 1, and is used for illustrating the process 30. In FIG. 4, a UE has PDN connections PDN1-PDN4 with an APN, and prepares to initiate a service with the APN by sending a request to the core network (e.g. EPC network). When the APN is in congestion (i.e., overloaded), the UE can obtain the information of APN congestion from a reject message with a back-off timer for its session management request message with the APN or from a broadcast channel. The UE can actively disconnect the PDN connections PDN2-PDN4 and keeps only the PDN connection PDN1 connected to maintain an active attach status with the APN. Therefore, resource of the PDN connections PDN2-PDN4 is released, and can be used by the APN, and an acceptance rate of the request for a high priority service or an emergency service is increased.

Please note that, a criterion based on which PDN connections the UE chooses to disconnect is not limited. For example, the criterion can be preference of a user of the UE, activities of the PDN connections PDN1-PDN4 (e.g. disconnecting the PDN connections with low activities), priorities of PDN connections PDN1-PDN4 (e.g. disconnecting the PDN connections with low priorities), or any combination of above. In other words, the UE may disconnect the PDN connections with priorities lower than a priority of the service to request, and keeps at least one PDN connection connected. The UE compares the priorities of the PDN connections PDN1-PDN4, chooses at least one PDN connection with at least one lowest priority, and disconnects the at least one PDN connection. Since at least one PDN connection is kept for maintaining the attach status, the UE does not need to reattach to the APN and additional delay is avoided. Therefore, when the PDN connection for priority/emergency services is established, the core network can further disconnect other PDN connection with a lower priority.

Therefore, according to the above illustration and the process 30, when a UE prepares to initiate a service with an APN, especially a high priority service or an emergency service, and the APN is in congestion, the UE can disconnect at least one PDN connection with the APN which are not necessary to obtain resource of the at least one PDN connection. When a back-off timer is running on the UE due to APN congestion control or the UE is aware of the APN connection from the broadcast channel, the UE can transmit a PDN disconnect message to the network for disconnecting a PDN connection. Preferably, the PDN disconnect message is a PDN DISCONNECT REQUEST message defined in the 3GPP standard. Accordingly, the service can be accepted with a higher acceptance rate by using the resource of the at least one PDN connection.

Figure 5:
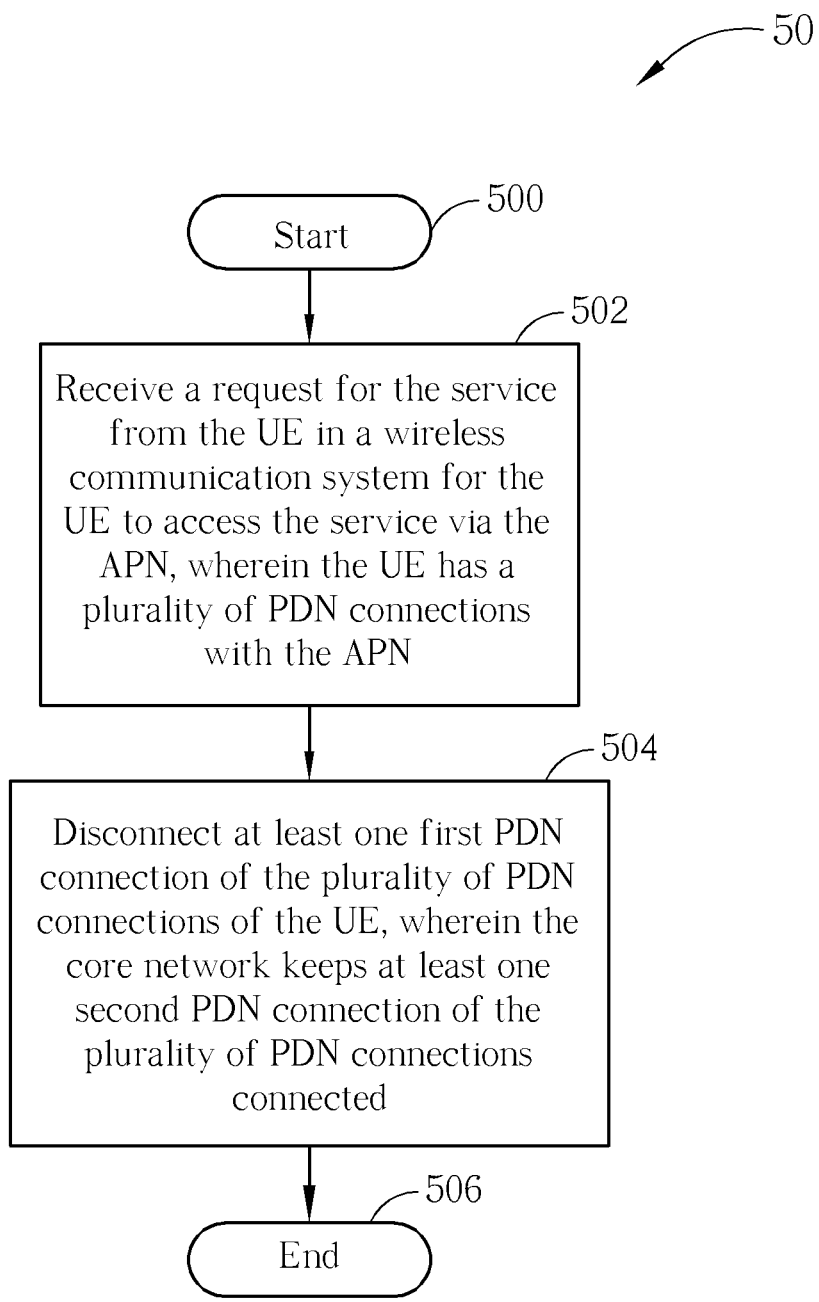
FIG. 5 is a flowchart of an exemplary process according to the present invention.

On the other hand, in addition to solve insufficient resource for accessing a service from a UE with multiple PDN connections associated to the same congested APN, it is also effective to solve the insufficient resource from the core network. Please refer to FIG. 5, which is a flowchart of a process 50 according to an example of the present invention. The process 50 is utilized in the core network shown in FIG. 1. The process 50 may be compiled into the program code 214 and includes the following steps:

Step 500: Start.

Step 502: Receive a request for a service from the UE in a wireless communication system for the UE to access the service via the APN, wherein the UE has a plurality of PDN connections with the APN.

Step 504: Disconnect at least one first PDN connection of the plurality of PDN connections of the UE, wherein the core network keeps at least one second PDN connection of the plurality of PDN connections connected.

Step 506: End.

According to the process 50, when the core network receives the request for the service from the UE to access the service via the APN, wherein the UE already has the plurality of PDN connections with the APN, the core network disconnects the at least one first PDN connection of the plurality of PDN connections of the UE, for releasing resource of the at least one first PDN connection, to increase the acceptance rate of the service. Besides, the core network keeps the at least one second PDN connection of the plurality of PDN connections connected. That is, the core network does not release all the PDN connections between the UE and the APN to maintain an attach status of the UE with the APN. Therefore, when the APN is in congestion, the APN is still possible to provide the service to the UE by using the resource of the at least one first PDN connection which is just released by the core network. The UE can access the service without a delay.

For example, please refer to FIG. 4, which is now used for illustrating the process 50. In FIG. 4, a UE has PDN connections PDN1-PDN4 with an APN, and prepares to initiate a service by sending a request to the core network. Since the APN is in congestion (i.e., overloaded), the core network can actively release network congestion situation by disconnecting the PDN connections PDN2-PDN4 of the UE, and keeps only the PDN connection PDN1 connected to maintain an attach status of the UE with the APN. The core network can transmit a PDN disconnect request message to the UE for deactivating (i.e., disconnect) all the EPS bearers of a PDN connection. Preferably, the deactivate request message is a DEACTIVATE EPS BEARER CONTEXT REQUEST message defined in the 3GPP standard. Therefore, resource of the PDN connections PDN2-PDN4 is released, and an acceptance rate of the request for a high priority service or an emergency service is increased.

Please note that, a criterion based on which PDN connections the core network chooses to disconnect is not limited. For example, the criterion can be preference of the core network, activities of the PDN connections PDN1-PDN4 (e.g. disconnecting the PDN connections with low activities), priorities of PDN connections PDN1-PDN4 (e.g. disconnecting the PDN connections with low priorities), or any combination of above. In other words, the core network may disconnect the PDN connections with priorities lower than a priority of the service, and keeps at least one PDN connection connected. The core network compares the priorities of the PDN connections PDN1-PDN4, chooses at least one PDN connection with at least one lowest priority, and disconnects the at least one PDN connection. Since at least one PDN connection is kept for maintaining the attach status, the UE does not need to reattach to the APN and additional delay is avoided. Therefore, when the PDN connection for priority/emergency services is established, the core network can further disconnect other PDN connection with lower priority.

Therefore, according to the above illustration and the process 50, when a UE prepares to initiate a PDN connection for a service to an APN by sending a request, especially a high priority service or an emergency service, and the APN is in congestion, a core network managing the UE can disconnect at least one PDN connection associated to the APN. Accordingly, the new PDN connection for the service can be accepted with a higher acceptance rate by using the resource released from the at least one disconnected PDN connection of the UE.

Above examples illustrate how to solve insufficient resource, when a UE prepares to initiate a PDN connection to an APN for a service. However, when the APN is in congestion for a long time, the UE may continue to retransmit a request for priority/emergency service for many times even though a back-off timer is used on the UE for non-priority/non-emergency services. The retransmissions and rejections worsen the congestion of the APN and increases load of the core network. In this situation, it is benefit to release resource in advance such that the core network can accept the request transmitted by the UE immediately.

Figure 6:
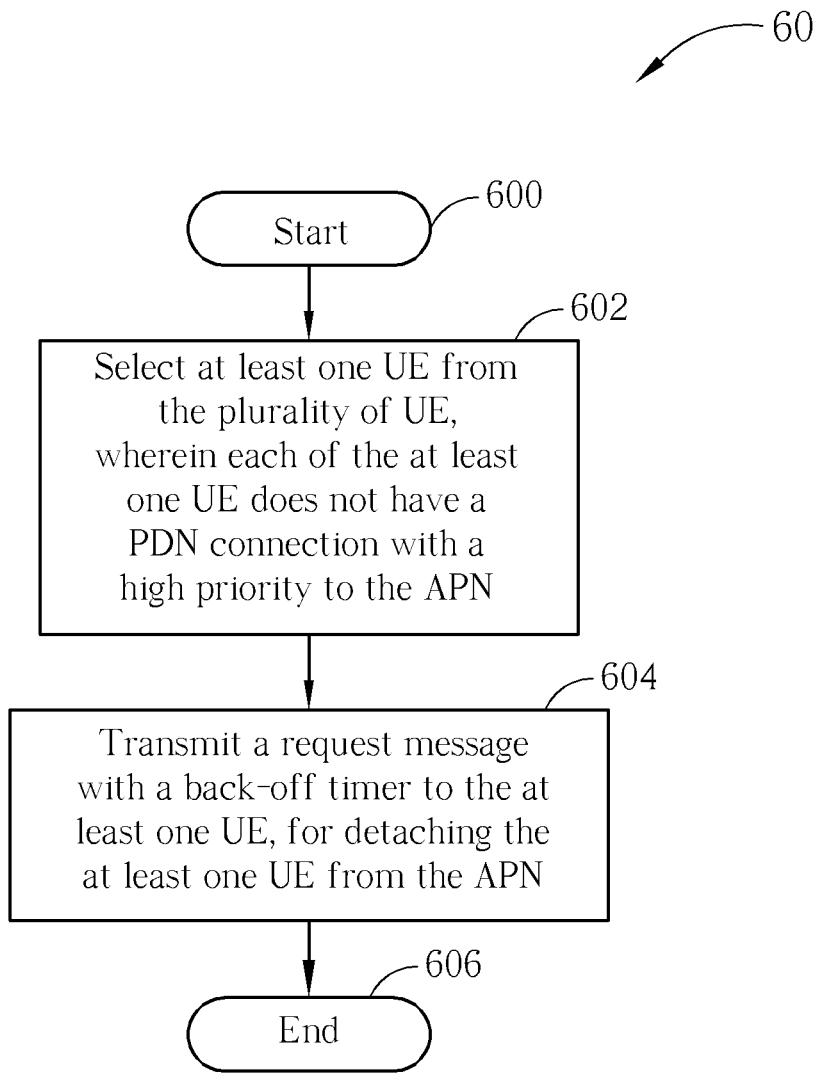
FIG. 6 is a flowchart of an exemplary process according to the present invention.

Please refer to FIG. 6, which is a flowchart of a process 60 according to an example of the present invention. The process 60 is utilized in the core network shown in FIG. 1, for handling a plurality of UEs, each of the plurality of UEs having at least one PDN connection associated to an APN. The process 60 may be compiled into the program code 214 and includes the following steps:

Step 600: Start.

Step 602: Select at least one UE from the plurality of UE, wherein each of the at least one UE does not have a PDN connection with a high priority to the APN.

Step 604: Transmit a request message with a back-off timer to the at least one UE, for detaching the at least one UE from the APN.

Step 606: End.

According to the process 60, when the core network detects the APN is in congestion, the core network first selects the at least one UE from the plurality of UE, wherein the each of the at least one UE does not have the PDN connection with the high priority to the APN. Then, the core network transmits the request message with the back-off timer to the at least one UE, for detaching the at least one UE from the APN. In other words, the core network does not wait for a request for a service from a UE and then tries to find resource for the service, but actively solves the congestion of the APN in advance. Therefore, not only an acceptance rate of the service can be increased, but a number of rejections and retransmissions of the request between the UE and the core network can be decreased. The resource for transmitting the rejections and the retransmissions can be saved, and load of the core network can be decreased.

Figure 7:
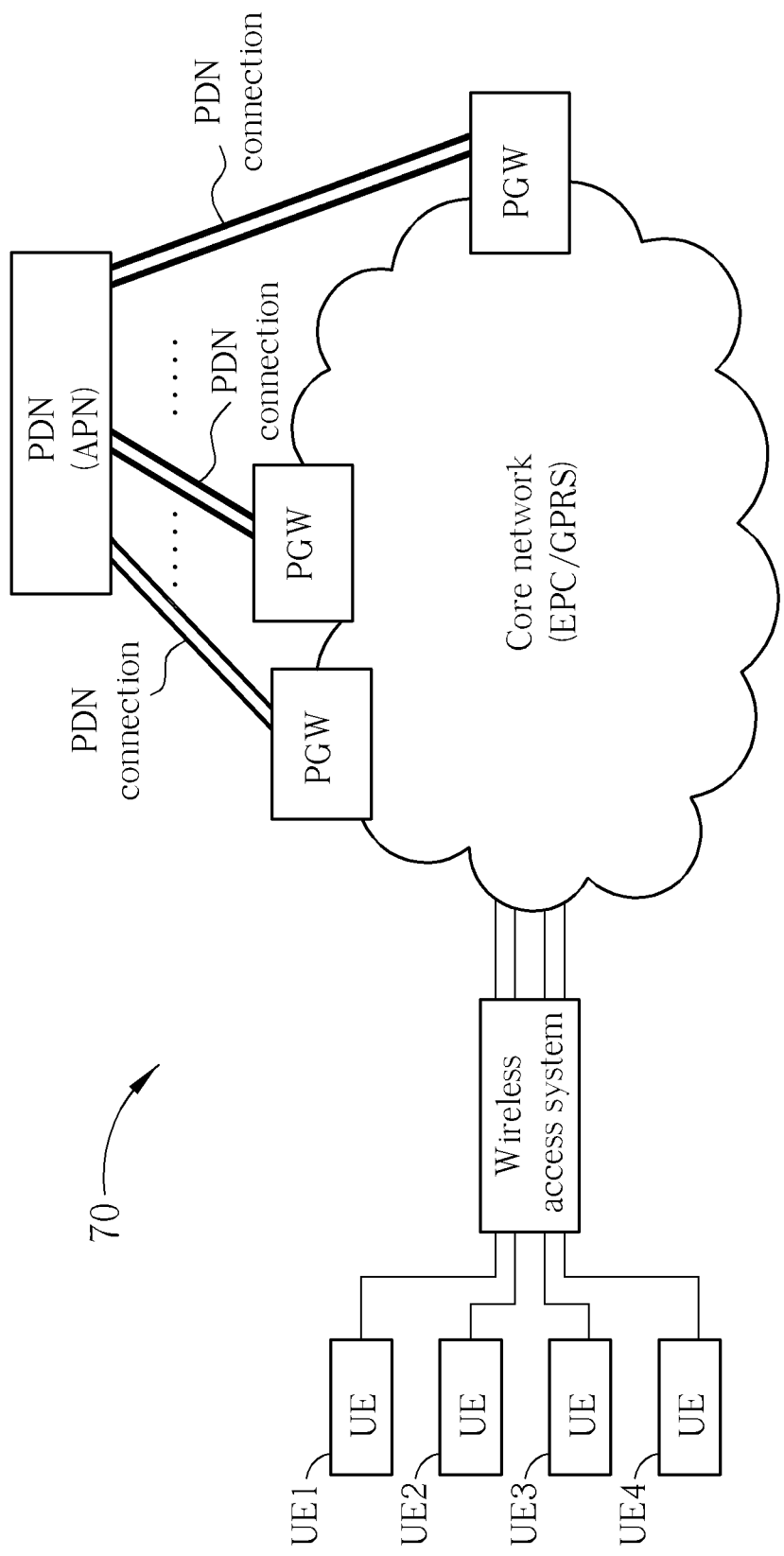
FIG. 7 is a schematic diagram of an exemplary wireless communication system according to the present invention.

For example, please refer to FIG. 7, which is a schematic diagram of a wireless communication system 70 according to an example of the present invention. FIG. 7 is used for illustrating the process 60, and there are UEs, UE1-UE4, a core network managing the UEs UE1-UE4 which have PDN connections associated to the same APN in the wireless communication system 70. In particular, each of the UEs UE1-UE4 has at least one PDN connection associated with the APN. The APN is in congestion (i.e., overloaded) and the core network determines to release resource in advance. After inspecting the UEs UE1-UE4 with their PDN connections, the core network may detach the UEs UE1-UE3 from the core network (i.e., detach the UEs UE1-UE3 from the APN) by sending a request message with a back-off timer to the UEs UE1-UE3. A criterion based on which the core network chooses the UEs UE1-UE3 is not limited. For example, the criterion can be that the UEs UE1-UE3 do not have a PDN connection with a high priority, i.e., a PDN connection carrying a high priority service or an emergency service. After the UEs UE1-UE3 receive the request message which is preferably a DETACH REQUEST message defined in the 3GPP standard, the UEs UE1-UE3 detach from the core network and will not ask the core network for attaching to the APN until the back-off timer expires, i.e., stop running. Therefore, not only the core network has resource for providing a high priority service or an emergency service without a delay, but a number of rejections and retransmissions of the request between the UE and the core network can be decreased.

Therefore, according to the above illustration and the process 60, when an APN is in congestion, a core network actively detaches at least one UE which has PDN connection associated to the APN for releasing resource from at the least one UE. The UE being detached is not able to reattach to the core network before the expiry of the back-off timer. In this situation, the core network may have enough resource for providing a high priority service or an emergency service to a UE requiring such services. Accordingly, not only an acceptance rate can be increased, but a number of rejections and retransmissions of the request between the UE and the core network can be decreased. The resource for transmitting the rejections and the retransmissions can be saved, and load of the core network can be decreased.

However, if a UE is detached from a core network, the UE needs to perform an attach procedure to reattach to the APN. Signalings of the attach procedure are exchanged between the UE and the core network. In general, a large amount of resources and power will be consumed on exchanging the signalings. Therefore, even though detaching the UE from the core network is an effective way for solving congestion of the APN, a method softer than detaching the UE may also be effective when the congestion of the APN is not too heavy.

Figure 8:
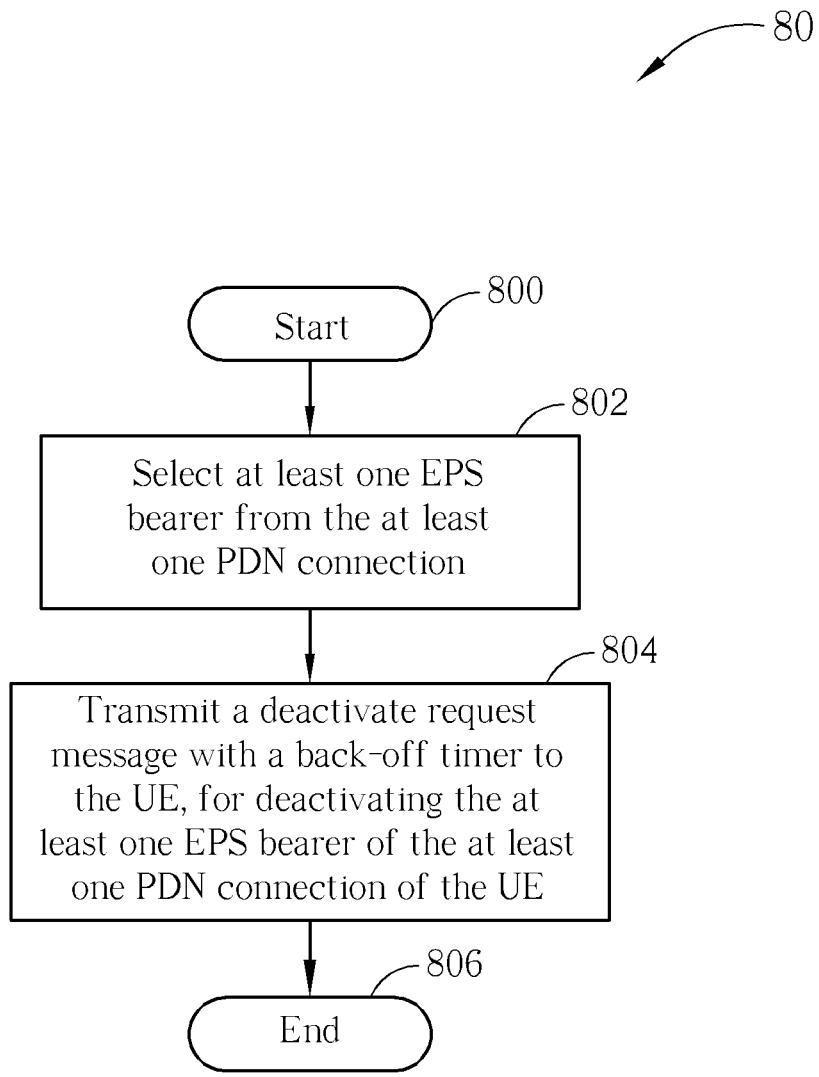
FIG. 8 is a flowchart of an exemplary process according to the present invention.

Please refer to FIG. 8, which is a flowchart of a process 80 according to an example of the present invention. The process 80 is utilized in the core network shown in FIG. 1, for handling at least one EPS bearer of at least one PDN connection associated to the APN of a UE. The process 80 may be compiled into the program code 214 and includes the following steps:

Step 800: Start.

Step 802: Select at least one EPS bearer from the at least one PDN connection.

Step 804: Transmit a deactivate request message with a back-off timer to the UE, for deactivating the at least one EPS bearer of the at least one PDN connection of the UE.

Step 806: End.

According to the process 80, when the core network detects that the APN is in congestion, the core network selects the at least one EPS bearer from the at least one PDN connection, and transmits the deactivate request message with the back-off timer to the UE, for deactivating the at least one EPS bearer of the at least one PDN connection for the UE. Before the expiry of the back-off timer, the UE is not allowed to reactivate the at least one EPS bearer within the at least one PDN connection. In other words, different from the process 30, the core network does not wait for a request for a service from the UE or another UE and then tries to find resource for the service, but actively solves the congestion of the APN in advance. Therefore, not only an acceptance rate of the service can be increased, but a number of rejections and retransmissions of the request between a UE and the core network can be decreased. The resource for transmitting the rejections and the retransmissions can be saved, and load of the core network can be decreased. Besides, different from the process 60, the process 80 only deactivates the at least one EPS bearer of the at least one PDN connection of the UE, but not detaches the UE for disconnecting all PDN connections of the UE. That is, the process 80 is softer than the process 60, and prevents the UE from spending resource and time on reconnecting to the APN.

Figure 9:
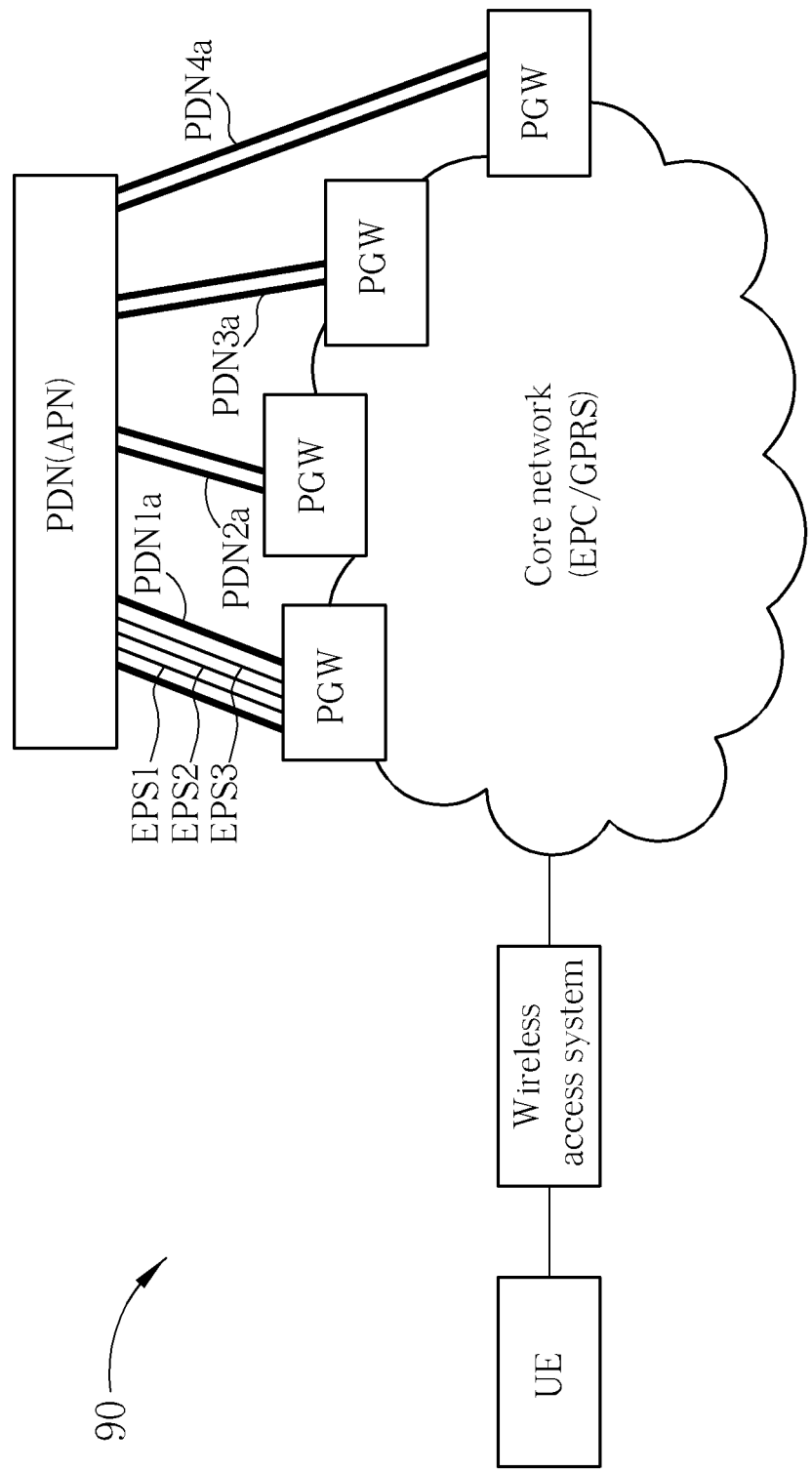
FIG. 9 is a schematic diagram of an exemplary wireless communication system according to the present invention.

For example, please refer to FIG. 9, which is a schematic diagram of a wireless communication system 90 according to an example of the present invention. FIG. 9 is simplified from FIG. 1, and is used for illustrating the process 80. In FIG. 9, a UE has multiple PDN connections PDN1a-PDN4a to an APN. Further, taking the PDN connection PDN1a as an example, there are EPS bearers EPS1-EPS3 in the PDN connection PDN1a. The APN is in congestion (i.e., overloaded) and the core network determines to release resource in advance. The core network can transmit a deactivate request message with a back-off timer to the UE for deactivating (i.e., disconnect) the EPS bearers EPS2-EPS3. Preferably, the deactivate request message is a DEACTIVATE EPS BEARER CONTEXT REQUEST message defined in the 3GPP standard. The UE will not ask the core network for reactivating the EPS bearers EPS2-EPS3 in the PDN connection PDN1a until the back-off timer expires, i.e., stop running. Therefore, not only the APN has resource for providing a high priority service or an emergency service without a delay, but a number of rejections and retransmissions of the request between a UE and the core network can be decreased. Besides, the above example only takes the PDN connection PDN1a and the EPS bearers therein as an example. Practically, EPS bearers in the PDN connections PDN2a-PDN4a may also be deactivated in the same way according to an choice of the core network, and is not limited herein Please note that, a criterion based on which the core network chooses at least one PDN connection and at least one EPS bearer therein to deactivate is not limited. For example, the criterion can be preference of the core network, activities of the at least one PDN connection, activities of EPS bearers of the at least one PDN connection (e.g. deactivating the EPS bearers with low activities), priorities of the at least one PDN connection, priorities of the EPS bearers of the at least one PDN connection (e.g. deactivating the EPS bearers with low priorities), and is not limited herein. In other words, the core network may deactivate the at least one EPS bearer with priorities lower than a predefined priority within the at least one PDN connection. Alternatively, the core network compares the priorities of the EPS bearers within the at least one PDN connection, chooses at least one EPS bearer with at least one lowest priority, and deactivate the at least one EPS bearer.

Therefore, according to the above illustration and the process 80, when an APN is in congestion, a core network managing the UE to access to the APN actively deactivates at least one EPS bearer from a UE for releasing resource. In this situation, the APN may have enough resource for providing a high priority service or an emergency service to a UE requiring such services. Accordingly, not only an acceptance rate can be increased, but a number of rejections and retransmissions of the request between the UE and the core network can be decreased. The resource for transmitting the rejections and the retransmissions can be saved, and load of the core network can be decreased.

Figure 10:
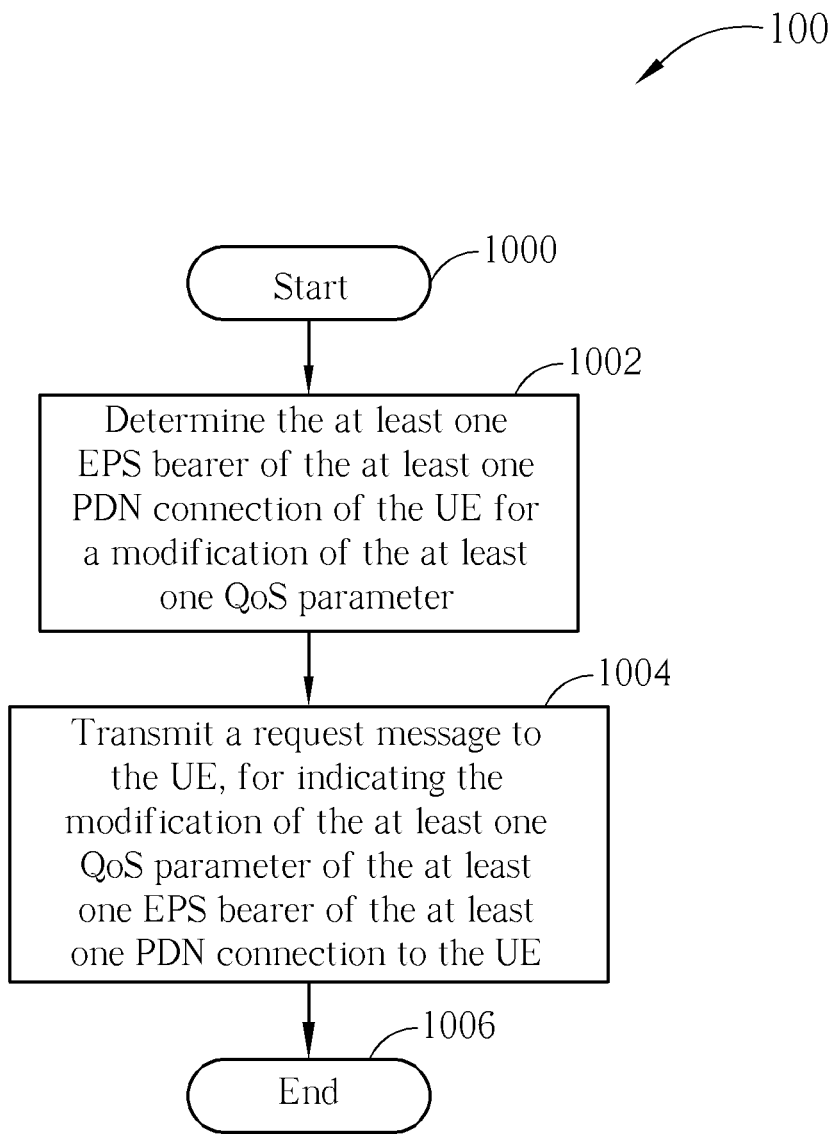
FIG. 10 is a flowchart of an exemplary process according to the present invention.

On the other hand, a core network can also release resource by adjusting at least one quality of service (QoS) parameter of at least one EPS bearer of at least one PDN connection of a UE. Please refer to FIG. 10, which is a flowchart of a process 100 according to an example of the present invention. The process 100 is utilized in the core network shown in FIG. 1, for handling the at least one QoS parameter of the at least one EPS bearer of the at least one PDN connection the UE. The process 100 may be compiled into the program code 214 and includes the following steps:

Step 1000: Start.

Step 1002: Determine the at least one EPS bearer of the at least one PDN connection of the UE for a modification of the at least one QoS parameter.

Step 1004: Transmit a request message to the UE, for indicating the modification of the at least one QoS parameter of the at least one EPS bearer of the at least one PDN connection to the UE.

Step 1006: End.

According to the process 100, when the core network detects that the APN is in congestion, the core network determines the at least one EPS bearer of the at least one PDN connection of the UE for the modification (e.g. reduction) of the at least one QoS parameter, and transmits the request message to the UE, for indicating the modification of the at least one QoS parameter of the at least one EPS bearer of the at least one PDN connection of the UE. In other words, the core network does not wait for a request for a service from the UE or another UE and then tries to find resource for the service, but solves the congestion of the APN in advance. Therefore, not only an acceptance rate of the service can be increased, but a number of rejections and retransmissions of the request between a UE and the core network can be decreased. The resource for transmitting the rejections and the retransmissions can be saved, and load of the core network can be decreased. Besides, similar to the process 80, the process 100 also provides a soft method for releasing the resource, and prevents the UE from spending resource and time on reattaching to the APN.

For example, please refer to FIG. 9, which is a schematic diagram of a wireless communication system 90 according to an example of the present invention. FIG. 9 is simplified from FIG. 1, and is used for illustrating the process 100. In FIG. 9, a UE has PDN connections PDN1a-PDN4a with an APN. Further, taking the PDN connection PDN1a as an example, there are EPS bearers EPS1-EPS3 in the PDN connection PDN1a. The APN is in congestion (i.e., overloaded) and the core network determines to release resource in advance. The core network first determines the EPS bearers EPS2-EPS3 of the PDN connection PDN1a for a reduction of at least one QoS parameter. Then, the core network transmits a request message to the UE, for indicating the reduction of the at least one QoS parameter of the EPS bearers EPS2-EPS3 of the PDN connection PDN1a to the UE. Preferably, the request message is a MODIFY EPS BEARER CONTEXT REQUEST message defined in the 3GPP standard. Further, the back-off timer can be a Session Management back-off timer defined in the 3GPP standard. The UE will not ask the core network for recovering the at least one QoS parameter of the EPS bearers EPS2-EPS3 of the PDN connection PDN1a with the APN until the back-off timer expires, i.e., stop running. Therefore, not only the APN has resource for providing a high priority service or an emergency service without a delay, but a number of rejections and retransmissions of the request between a UE and the core network can be decreased. Besides, the above example only takes the PDN connection PDN1a and the EPS bearers therein as an example. Practically, QoS parameters of EPS bearers in the PDN connections PDN2a-PDN4a may also be modified in the same way according to an choice of the core network, and is not limited herein Please note that, a criterion based on which the core network reduces the at least one QoS parameter of at least one EPS bearer of at least one PDN connection of a UE is not limited. For example, the criterion can be preference of the core network, activities of the at least one EPS bearer (e.g. QCI as a QoS parameter of the at least one EPS bearer with low activities are largely reduced), priorities of the at least one EPS bearer (e.g. ARP as a QoS parameter of the at least one EPS bearer with low priorities are largely reduced), or any combination of above. Besides, the at least one QoS parameter may be at least one of an Quality class index (QCI), Allocation and Retention Priority (ARP), aggregated maximum bit rate (AMBR), a maximum bit rate (MBR) and a guaranteed bit rate (GBR) of the at least one EPS bearer, and is not limited herein. Further, the UE must accept the reduction of the at least one QoS parameter after receiving the request message, if a back-off timer is running (i.e., meaning the APN is in congestion). Alternatively, the UE disconnect the PDN connection or detaches from the core network in the case that the UE has only one PDN connection, if the UE can not accept the reduction of the at least one QoS parameter after receiving the request message and the back-off timer is running. Therefore, the effectiveness of the process 100 is guaranteed even if the UE does not support the reduction the at least one QoS parameter.

Therefore, according to the above illustration and the process 100, when an APN is in congestion, a core network managing the APN actively modifies at least one QoS parameter of at least one EPS bearer for at least one PDN connection of a UE for releasing resource from the at least one PDN connection. In this situation, the APN may have enough resource for providing a high priority service or an emergency service to a UE requiring such services. Accordingly, not only an acceptance rate can be increased, but a number of rejections and retransmissions of the request between the UE and the core network can be decreased. The resource for transmitting the rejections and the retransmissions can be saved, and load of the core network can be decreased.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

In conclusion, the present invention provides several methods for solving insufficient resource of an APN. The methods include both active and inactive methods which can be utilized in a UE connected to the APN or a core network managing the APN. Therefore, when the UE needs to access a high priority service or an emergency service with the APN, a request for the high priority service or the emergency service can be accepted immediately without a delay.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of initiating a service with an access point name (APN) of a wireless communication system for a mobile device in the wireless communication system, the mobile device having a plurality of connections with the APN, the APN being congested or overloaded, the method comprising:
   disconnecting, by the mobile device, at least one first connection of the plurality of connections from the APN, and keeping, by the mobile device, at least one second connection of the plurality of connections connected; and
   initiating, by the mobile device, the service with the APN, after disconnecting the at least one first connection from the APN.

2. The method of claim 1, wherein the service is a high priority service or an emergency service.

3. The method of claim 1, wherein disconnecting, by the mobile device, the at least one first connection from the APN comprises:
   disconnecting, by the mobile device, the at least one first connection from the APN according to at least one of preference of a user of the mobile device, activities of the plurality of connections and priorities of the plurality of connections.

4. The method of claim 1, wherein the plurality of connections are packet data network (PDN) connections.

5. A method of handling a service for a network of a wireless communication system, an access point name (APN) of the wireless communication system being congested or overloaded, the method comprising:
   receiving, by the network, a request for the service from a mobile device in the wireless communication system for the mobile device to access the service via the APN of the wireless communication system, wherein the mobile device has a plurality of connections with the APN; and
   disconnecting, by the network, at least one first connection of the plurality of connections of the mobile device, and keeping, by the network, at least one second connection of the plurality of connections connected.

6. The method of claim 5, wherein the service is a high priority service or an emergency service.

7. The method of claim 5, wherein disconnecting, by the network, the at least one first connection of the mobile device comprises:
   disconnecting, by the network, the at least one first connection of the mobile device according to at least one of preference of the network, activities of the plurality of connections and priorities of the plurality of connections.

8. The method of claim 5, wherein the plurality of connections are packet data network (PDN) connections.

9. The method of claim 5, wherein the network comprises a mobility management entity (MME) or a Serving GPRS Support Network (SGSN).

10. A method of handling a plurality of mobile devices in a wireless communication system for a network of the wireless communication system, each of the plurality of mobile devices having at least one connection to an access point name (APN) of the wireless communication system, the APN being congested or overloaded, the method comprising:

selecting, by the network, at least one mobile device from the plurality of mobile devices, wherein each of the at least one mobile device does not have a connection with a high priority to the APN; and transmitting, by the network, a request message with a back-off timer to the at least one mobile device, for detaching the at least one mobile device from the APN.

11. The method of claim 10 further comprising:
detaching, by the at least one mobile device, from the APN, and stopping, by the at least one mobile device, reattaching to the APN before the back-off timer expires.

12. The method of claim 10, wherein the request message is a DETACH REQUEST message defined in the 3GPP standard.

13. A method of handling at least one bearer of at least one connection of a mobile device in a wireless communication system for a network of the wireless communication system, the mobile device having the at least one connection with an access point name (APN) of the wireless communication system, the APN being congested or overloaded, the method comprising:

selecting, by the network, the at least one bearer from the at least one connection; and transmitting, by the network, a deactivate request message with a back-off timer to the mobile device, for deactivating the at least one bearer of the mobile device without detaching the mobile device.

14. The method of claim 13, wherein selecting, by the network, the at least one bearer from the at least one connection comprises:

selecting, by the network, the at least one bearer from the at least one connection according to at least one of preference of the network, activities of the at least one bearer and priorities of the at least one bearer.

15. The method of claim 13 further comprising:
deactivating, by the mobile device, the at least one bearer from the APN, and stopping, by the mobile device, reactivating the at least one bearer to the APN before the back-off timer expires.

16. The method of claim 13, wherein the deactivate request message is a DEACTIVATE EVOLVED PACKET SYSTEM (EPS) BEARER CONTEXT REQUEST message defined in the 3GPP standard.

17. The method of claim 13, wherein the at least one bearer is at least one EPS bearer, and the at least one connection is at least one packet data network (PDN) connection.

18. A method of handling at least one bearer of at least one connection of a mobile device in a wireless communication system for a network of the wireless communication system, the mobile device having the at least one connection with an access point name (APN) of the wireless communication system, the APN being congested or overloaded, the method comprising:

determining, by the network, the at least one bearer of the at least one connection for a modification of at least one quality of service (QoS) parameter; and transmitting, by the network, a request message to the mobile device, for indicating the modification of the at least one QoS parameter of the at least one bearer of the at least one connection to the mobile device.

19. The method of claim 18, wherein the at least one QoS parameter comprises at least one of an aggregated maximum bit rate (AMBR), a maximum bit rate (MBR) and a guaranteed bit rate (GBR).

20. The method of claim 18, wherein determining, by the network, the at least one bearer of the at least one connection for the modification of the at least one QoS parameter comprises:

determining, by the network, the at least one bearer of the at least one connection for the modification of the at least one QoS parameter according to at least one of preference of the network, activities of the at least one bearer and priorities of the at least one bearer.

21. The method of claim 18 further comprising:
accepting, by the mobile device, the modification of the at least one QoS parameter after receiving the request message, if a back-off timer is running; or disconnecting, by the mobile device, the at least one connection from the APN, if the back-off timer is running and if the mobile device can not accept the modification of the at least one QoS parameter after receiving the request message.

22. The method of claim 21, wherein the back-off timer is a Mobility Management back-off timer or a Session Management back-off timer defined in the 3GPP standard.

23. The method of claim 18, wherein the at least one bearer is at least one evolved packet system (EPS) bearer, and the at least one connection is at least one packet data network (PDN) connection.

24. The method of claim 18, wherein the request message is a MODIFY EPS BEARER CONTEXT REQUEST message defined in the 3GPP standard.

* * * * *